(12) United States Patent
Bechmann et al.

(10) Patent No.: US 11,577,404 B2
(45) Date of Patent: Feb. 14, 2023

(54) UNPACKING DEVICE FOR UNPACKING AN ADDITIVELY MANUFACTURED THREE-DIMENSIONAL OBJECT FROM THE SURROUNDING CONSTRUCTION MATERIAL

(71) Applicant: CL SCHUTZRECHTSVERWALTUNGS GMBH, Lichtenfels (DE)

(72) Inventors: Florian Bechmann, Lichtenfels (DE); Fabian Zeulner, Lichtenfels (DE); Jens Stammberger, Rödental (DE); Ralf Hetzel, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 884 days.

(21) Appl. No.: 15/812,726

(22) Filed: Nov. 14, 2017

(65) Prior Publication Data
US 2018/0133903 A1    May 17, 2018

(30) Foreign Application Priority Data
Nov. 14, 2016   (DE) .......................... 102016121773.5

(51) Int. Cl.
*B25J 15/00* (2006.01)
*B33Y 30/00* (2015.01)
(Continued)

(52) U.S. Cl.
CPC ........... *B25J 15/0019* (2013.01); *B22F 12/00* (2021.01); *B29C 64/20* (2017.08); *B33Y 30/00* (2014.12);
(Continued)

(58) Field of Classification Search
CPC ...... B25J 15/0019; B33Y 30/00; B33Y 40/00; B29C 64/20
See application file for complete search history.

(56) References Cited

U.S. PATENT DOCUMENTS

2002/0090410 A1 * 7/2002 Tochimoto ............ B29C 64/321
425/215
2012/0113439 A1    5/2012 Ederer
(Continued)

FOREIGN PATENT DOCUMENTS

CN    105195741 B    9/2017
DE    102004041633 A1    3/2006
(Continued)

OTHER PUBLICATIONS

European Search Report Corresponding to Application No. 19216946 dated Feb. 14, 2020.
(Continued)

*Primary Examiner* — Joseph S Del Sole
*Assistant Examiner* — John Robitaille
(74) *Attorney, Agent, or Firm* — Dority & Manning, P.A.

(57) ABSTRACT

An unpacking device (4) for unpacking an additively manufactured three-dimensional object (2) from the unsolidified construction material (3) surrounding it after completion of an additive construction process, wherein the unpacking device (4) is formed as a robot (7) having at least three robot axes (A1-A6), especially an industrial robot, wherein at least one unpacking tool (10) is arranged or formed on a robot axis (A6), which is provided for unpacking an additively manufactured three-dimensional object (2) from the unsolidified construction material (3) surrounding it after completion of an additive construction process, or the unpacking device (4) comprises at least one such robot (7).

20 Claims, 2 Drawing Sheets

(51) Int. Cl.
*B29C 64/20* (2017.01)
*B22F 10/10* (2021.01)
*B33Y 40/00* (2020.01)
*B22F 12/00* (2021.01)
*B33Y 40/20* (2020.01)

(52) U.S. Cl.
CPC ............... *B33Y 40/00* (2014.12); *B33Y 40/20* (2020.01); *B22F 10/10* (2021.01); *Y02P 10/25* (2015.11)

(56) References Cited

U.S. PATENT DOCUMENTS

| | | |
|---|---|---|
| 2012/0211155 A1 | 8/2012 | Wehning et al. |
| 2013/0278920 A1 | 10/2013 | Loewgren |
| 2018/0065208 A1 | 3/2018 | Mori et al. |

FOREIGN PATENT DOCUMENTS

| | | | |
|---|---|---|---|
| DE | 102007018601 A1 | 10/2008 | |
| DE | 102007033434 A1 | 1/2009 | |
| DE | 102009029765 A1 | 12/2010 | |
| DE | 102010015451 A1 | 10/2011 | |
| DE | 102012020000 A1 | 4/2014 | |
| EP | 2289652 A1 | 3/2011 | |
| JP | 005937249 B1 * | 6/2016 | ............ B22F 3/1055 |
| JP | 2016527390 A | 9/2016 | |
| JP | 2016175153 A | 10/2016 | |
| WO | WO2015141776 A | 9/2015 | |

OTHER PUBLICATIONS

Chinese Office Action Correspondng to Application No. 201710818596.X dated May 28, 2019.
European Search Results Corresponding to Application 17186296 dated Apr. 11, 2018.
European Search Opinion Corresponding to Application 17186296.4 dated Apr. 18, 2018.
German Search Report Corresponding to Application No. 102016121773.5 dated Jan. 9, 2019.
Japanese Office Action Corresponding to Application No. 2017217185 dated Nov. 16, 2018.

* cited by examiner

UNPACKING DEVICE FOR UNPACKING AN ADDITIVELY MANUFACTURED THREE-DIMENSIONAL OBJECT FROM THE SURROUNDING CONSTRUCTION MATERIAL

CROSS-REFERENCE TO RELATED APPLICATIONS

This application claims priority to German Patent Application serial no. 10 2016 121 773.5 filed Nov. 14, 2016, the contents of which is incorporated herein by reference in its entirety as if set forth verbatim.

The invention relates to an unpacking device for unpacking an additively manufactured three-dimensional object from the unsolidified construction material surrounding it after completion of an additive construction process.

Additive manufacturing of three-dimensional objects by successive, selective layer-by-layer exposure and thus successive, selective layer-by-layer solidification of construction material layers of construction material that can be solidified by means of (highly) energetic radiation, especially laser radiation, typically takes place in a construction room or construction chamber of a construction module. After completion of the additive construction process, the additively manufactured three-dimensional objects are surrounded by unsolidified powdery construction material.

For unpacking the additively manufactured three-dimensional objects from the surrounding construction material, unpacking devices are known. Respective unpacking devices can be formed, e.g., as suction devices, which are provided for sucking off the unsolidified construction material surrounding the three-dimensional object(s) to be unpacked. It is common here that a suction element forming a component part of a respective suction device, e.g., in the form of a suction lance, is handled manually.

This approach is in need of improvement, especially with regard to automatability, efficiency, and security of the unpacking process.

The invention is based on the object to provide, especially with regard to automatability, efficiency, and security of the unpacking process, an improved unpacking device for unpacking an additively manufactured three-dimensional object from the unsolidified construction material surrounding it after completion of an additive construction process.

The object is solved by an unpacking device according to claim 1. The dependent claims relate to possible embodiments of the unpacking device.

The unpacking device described herein serves the unpacking of an additively manufactured three-dimensional object ("object") from the unsolidified powdery construction material (construction material that can be solidified in the course of the successive, selective layer-by-layer exposure and thus successive, selective layer-by-layer solidification of the construction material layers performed during additive manufacturing of the object) surrounding it after completion of an additive construction process. The construction material is metal powder, for example; nevertheless, ceramic or plastic powder is conceivable as construction material as well. Unpacking is generally understood to mean removal of the construction material surrounding the respective object; the respective object is "freed" from the surrounding construction material.

The unpacking device described herein is formed as a robot ("unpacking robot") having at least three (different) robot axes, especially as an industrial robot having at least three (different) robot axes, or comprises at least one, i.e.—if necessary—also several, such robot(s).

A respective robot typically has at least one robot arm, which comprises several robot elements flexibly connected with each other via joint elements, typically arranged in series connection. The robot axes are typically assigned to respective robot elements connected with each other via joint elements. The robot can be designed, e.g., as a jointed arm or articulated arm robot with several robot elements arranged in series connection, flexibly connected with each other via respective joint elements. One, several, or all joint elements of the robot can be formed as swivel joints. Basically, the robot can be any type of robot or industrial robot having at least three robot axes.

At least one unpacking tool is arranged or formed on a robot axis, which is provided for unpacking an additively manufactured three-dimensional object from the unsolidified construction material surrounding it after completion of an additive construction process. The robot axis on which the at least one unpacking tool is arranged or formed is typically a robot axis which is assigned to a robot element forming a free end of the robot arm.

By forming the unpacking device as a robot or due to the fact that the unpacking device comprises at least one corresponding robot, automatable or automated unpacking of respective objects is possible. It is not necessary to manually handle a suction element forming a component part of a suction device. Unpacking processes are improved with regard to automatability, efficiency, and security.

Hence, especially with regard to automatability, efficiency, and security of the unpacking process, an improved unpacking device for unpacking an additively manufactured three-dimensional object from the unsolidified construction material surrounding it after completion of an additive construction process is provided.

The robot can have more than three robot axes, especially five, six, or more robot axes. The more robot axes the robot has, the greater is its freedom of movement within the scope of unpacking the respective objects. It has been mentioned that the robot can be designed as a jointed arm or articulated arm robot. In an advantageous embodiment, the robot is designed as a five- or six-axle jointed arm or articulated arm robot.

Regardless of their number and thus also the concrete design of the robot, respective robot axes can typically be controlled independently. Accordingly, the robot axes can be moved independently. Each robot axis can typically be moved in at least one freedom degree of motion.

The unpacking tool can be a suction and/or blower tool forming part of a suction and/or blower device, especially a suction nozzle or lance or a blower nozzle or lance, or comprise such a suction and/or blower tool. A respective suction and/or blower tool is connected to a part of the suction and/or blower device generating a suction or blower flow via pipe elements, e.g., arranged or formed on or in the robot, that can be flown through by a suction or blower flow. Unpacking of respective objects is performed by sucking and/or blowing off construction material by means of respective suction and/or blower tools. It is conceivable that a combined unpacking process provides for sucking off construction material by means of a suction tool and blowing off remaining construction material by means of a blower tool. The suction process and the blowing process can take place simultaneously, wherein it is possible that the suction tool sucks in a blower flow generated by the blower tool, guided across the object and containing construction material, by means of a suction flow generated by the suction tool, or at staggered intervals. In all cases, inert unpacking of respective objects can be realized; hence, a suction and/or blower flow used can be inert. Apart from unpacking tools in the form of respective suction and/or blower tools, of course, also other unpacking tools, i.e., for example, unpacking tools in the form of brushes, paintbrushes, shovels, or the like are conceivable.

A respective unpacking tool can be arranged or attached detachably on/to the respective robot axis. To realize a detachable attachment of a respective unpacking tool, suitable, especially mechanic, mounting interfaces can be arranged or formed on the robot and/or on the unpacking tool, which allow detachable attachment of an unpacking tool to the robot axis. However, detachable attachment of an unpacking tool to the respective robot axis can also be realized by the robot axis comprising a gripping element, which is provided for gripping an unpacking tool.

The detachable arrangement or attachment of a respective unpacking tool on/to the respective robot axis allows for an unpacking tool to be arranged or attached exchangeably as necessary on/to the respective robot axis. An exchange process of a respective unpacking tool can be performed automatedly as well. The robot can be set, e.g., in a tool change mode or program specifically designed for that, to perform an unpacking tool change. Here, the robot can be movable, e.g., to an exchange position in which the robot autonomously performs unpacking tool changes. In the exchange position, the robot, i.e., at least the robot axis to which the unpacking tool is to be or is attached detachably, can give unpacking tools to a tool magazine assigned to the unpacking device or take unpacking tools from a tool magazine assigned to the unpacking device.

The unpacking device typically comprises a control device implemented by hardware and/or software, provided for generating control information controlling the movements of the robot axes during operation of the robot. The control device can be provided for generating respective control information on the basis of data describing the geometric structural design of a respective object to be unpacked, especially on the basis of construction data describing the geometric structural design of a respective object to be unpacked. The movements of the robot axes can therefore be adapted to the geometric structural design or geometric structural characteristics of the object to the unpacked, i.e., especially the outer and/or inner contour, any undercuts, etc. Unpacking processes can be controlled individually by taking into account the geometric structural design of a respective object to be unpacked. Thus, the computational effort for generating respective control information controlling the movements of the robot axes or the robot elements can be reduced (considerably), and especially the efficiency of the unpacking processes that can be or are performed with the unpacking device can be increased (considerably).

In addition to the unpacking device, the invention also relates to an unpacking station for a system for additive manufacturing of three-dimensional objects. The unpacking station is characterized in that it comprises at least one unpacking device as described. Hence, all explanations in connection with the unpacking device apply analogously to the unpacking station.

The unpacking station can comprise an, especially cubical, unpacking chamber, which can form a part of a housing structure associated with the unpacking station. Typically, the unpacking station can be rendered or is inert. The robot(s) associated with the unpacking device can be arranged or formed on or in a bottom, side, or top wall of the unpacking chamber limiting the unpacking chamber. Basically, both standing and (laterally) hanging arrangements of robots are conceivable.

The unpacking device or the robot(s) associated with the unpacking device can be arranged or formed in a fixed position or movably supported in at least one freedom degree of motion in the unpacking chamber. If the robot(s) does/do not have its/their own movement drives, suitable movement devices can be provided on the unpacking chamber side, which will allow guided movement of a robot, especially along a certain movement path. Respective movement devices can contain, e.g., guided movement of a robot along an object to be unpacked inside a construction module containing the object to be unpacked that is moved to the unpacking station. Here, the robot can be moved to (pre-) defined unpacking positions relative to the object to be unpacked or relative to the construction module. The unpacking positions, in turn, can be selected on the basis of the geometric structural design of the object to be unpacked. Thus, the computational effort for computer-based selection of advantageous unpacking positions of the robot can be reduced.

In addition to the unpacking device and unpacking station, the invention also relates to a system for additive manufacturing of three-dimensional objects. The system is characterized in that it comprises at least one unpacking station as described. Hence, all explanations in connection with the unpacking device and in connection with the unpacking station apply analogously to the system.

In addition to the unpacking station, the system typically comprises at least one apparatus for additive manufacturing of three-dimensional objects, i.e., for example, technical components or technical component groups, by successive, selective layer-by-layer exposure and thus solidification of construction material layers of construction material that can be solidified by means of a laser beam. The selective solidification of respective construction material layers to be selectively solidified is carried out based on object-related construction data. Respective construction data describe the geometric structural design of the respective object to be manufactured additively and can contain, for example, "sliced" CAD data of a respective object to be manufactured additively. The apparatus can be formed as an SLM apparatus, i.e. as an apparatus for performing selective laser melting methods (SLM methods), or as an SLS apparatus, i.e. as an apparatus for performing selective laser sintering methods (SLS methods).

The invention is explained in more detail by means of exemplary embodiments in the figures of the drawings. In which:

FIG. 1 shows a schematic diagram of an unpacking station 1 according to an exemplary embodiment.

Figure 1:
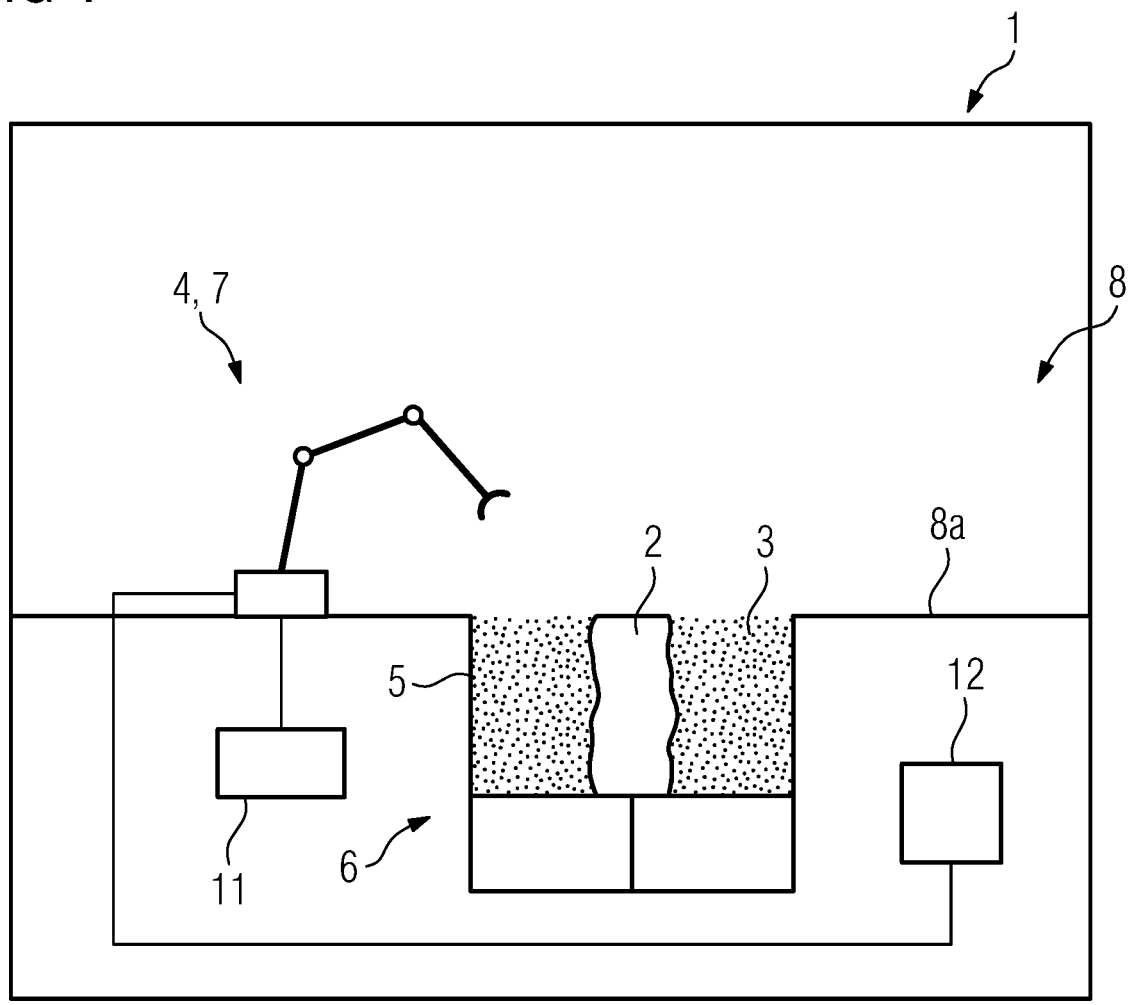
FIG. 1 shows a schematic diagram of an unpacking station according to an exemplary embodiment.

The unpacking station 1 is assigned to an apparatus (not shown) for additive manufacturing of three-dimensional objects 2, i.e., especially technical components or technical component groups. The apparatus is provided for additive manufacturing of three-dimensional objects 2 by successive, selective layer-by-layer exposure and thus solidification of construction material layers of construction material 3 that can be solidified, i.e., for example, metal powder, by means of a laser beam. The selective solidification of respective construction material layers to be solidified selectively is performed based on object-related construction data.

Respective construction data describe the geometric or geometric structural design of the respective object 2 to be manufactured additively.

The apparatus as well as the unpacking station 1 assigned to it form component parts of a superordinate system (not shown) for additive manufacturing of three-dimensional objects 2.

The unpacking station 1 comprises an unpacking device 4. The unpacking device 4 is arranged in an unpacking chamber 8 of the unpacking station 1, which can be rendered or is inert. The unpacking chamber 8 can form part of a housing structure (not denoted in more detail) associated with the unpacking station 1.

The unpacking device 4 is provided for unpacking an additively manufactured three-dimensional object 2 from the unsolidified powdery construction material 3 surrounding it after completion of an additive construction process. In the exemplary embodiment shown in FIG. 1, the object 2 and the construction material 3 surrounding it are arranged in a construction room 5 or construction chamber of a construction module 6 moved to the unpacking station 1.

The unpacking device 4 is formed as a robot 7 having at least three (different) robot axes A1-A6. The robot 7 is arranged, e.g., on a bottom wall 8a of the unpacking chamber 8 limiting the unpacking chamber 8 at the bottom. However, it is also conceivable that the robot 7 is arranged or formed on a side wall or top wall of the unpacking chamber 8 limiting the unpacking chamber 8. Basically, both standing and (laterally) hanging arrangements of robots 7 are conceivable.

The robot 7 can be arranged in a fixed position or movably supported in at least one freedom degree of motion in the unpacking chamber 8. If the robot 7 does not have its own movement drives, suitable movement devices (not shown) can be provided on the unpacking chamber side, which will allow guided movement of the robot 7, especially along a certain movement path. Respective movement devices can contain, e.g., guided movement of the robot 7 along the object 2 to be unpacked or inside the construction module 6 containing the object 2 to be unpacked that is moved to the unpacking station 1. Here, the robot 7 can be moved to (pre-)defined unpacking positions which can be selected on the basis of the geometric structural design of the object 2 to be unpacked.

Figure 2:
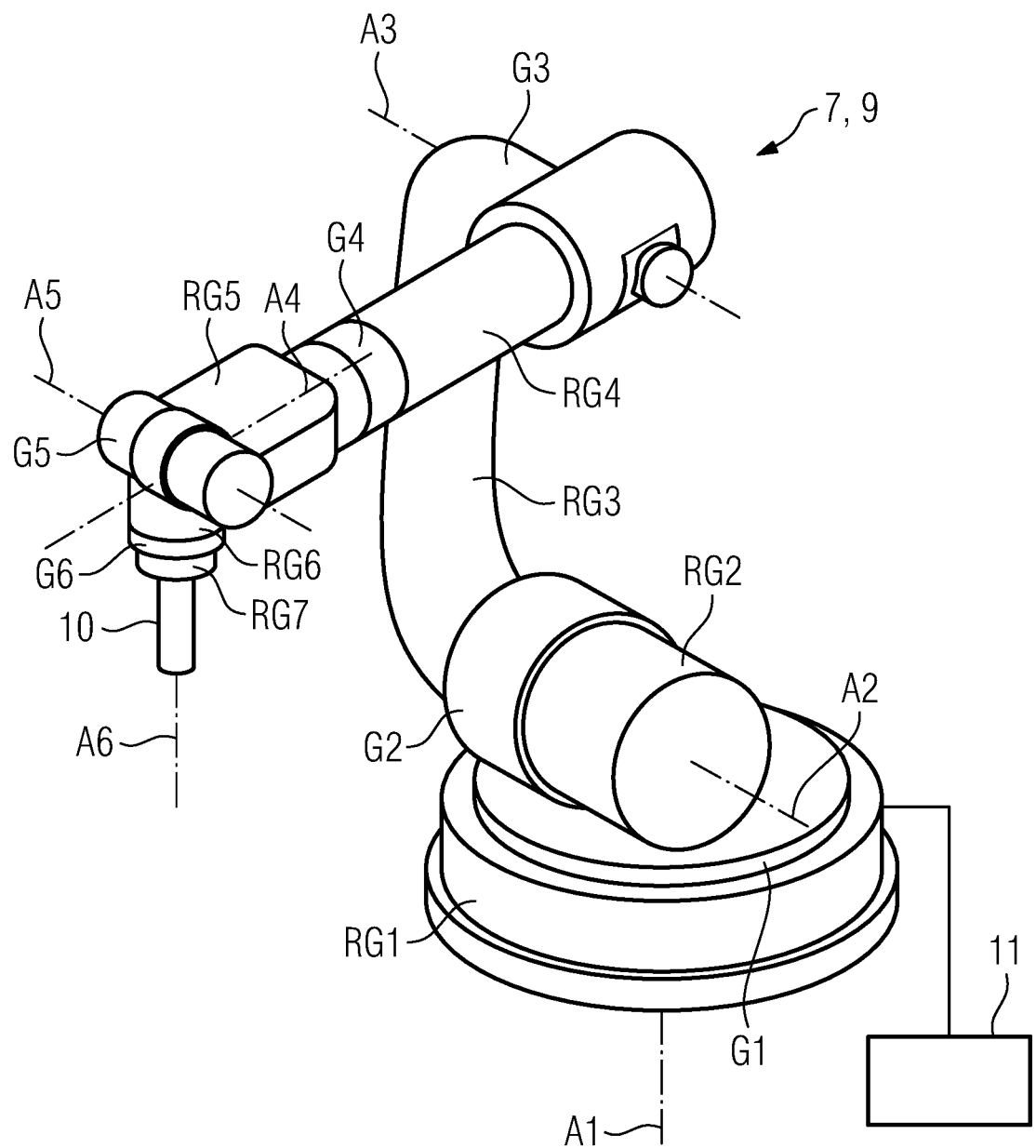
FIG. 2 shows a schematic diagram of a robot according to an exemplary embodiment.

FIG. 2 shows a schematic diagram of a robot 7 according to an exemplary embodiment as to which robot 7 can be used in the unpacking station 1 shown in FIG. 1.

The robot 7 is designed as a jointed arm or articulated arm robot and comprises a robot arm 9. The robot arm 9 comprises several robot elements RG1-RG7 arranged in series connection, flexibly connected with each other via joint elements G1-G6. The joint elements G1-G6 are swivel joints. The joint elements G1-G6 establish a swivel connection of robot elements RG 1-RG7 each arranged (directly) adjacently. Evidently, the robot axes A1-A6 are assigned to the joint elements G1-G6 or the robot elements RG1-RG7 connected with each other via the joint elements G1-G6.

The respective robot axes A1-A6 or joint elements G1-G6 or robot elements RG1-RG7 can be controlled independently and accordingly moved independently. Control of the movements of the robot elements RG1-RG7, i.e., control of the operation of the robot 7, is exercised via a control device 11 implemented by hardware and/or software.

In the exemplary embodiment shown in FIG. 2, the robot elements RG1-RG7 are a basis (robot element RG1), a carousel (robot element RG2) connected downstream of that, pivoting around the robot axis A1, a swinging link (robot element RG3) connected downstream of that, pivoting around the robot axis A2, a cantilever (robot element RG4) connected downstream of that, pivoting around the robot axis A3, a multiaxial robot hand (robot element RG5) connected downstream of that, pivoting around the robot axis A4, a fastening device (robot element RG6) connected downstream of that, pivoting around the robot axis A5, and a tool holding device (robot element RG7) connected downstream of that, pivoting around the robot axis A6. Instead of the tool holding device, a robot tool could be arranged as well.

On the (last) joint G6 or the (last) robot element RG7 forming the free end of the robot arm 9, an unpacking tool 10 provided for unpacking an additively manufactured three-dimensional object 2 from the unsolidified construction material 3 surrounding it after completion of an additive construction process is arranged.

In the exemplary embodiments shown in FIG. 2, the unpacking tool 10 is a suction and/or blower tool forming part of a suction and/or blower device (not shown), especially a suction nozzle or lance or a blower nozzle or lance. The suction and/or blower tool is connected to a part of the suction and/or blower device generating a suction or blower flow via pipe elements (not shown), e.g., arranged or formed on or in the robot 7, that can be flown through by a suction or blower flow. Unpacking of respective objects 2 is therefore performed by sucking and/or blowing construction material 3 off the object 2. Here, inert unpacking of the object 2 is possible, because an inert suction and/or blower flow, i.e., for example, an argon or nitrogen gas flow, can be used.

The construction material 3 removed from the object 2 within the scope of unpacking can be guided into a processing device 12 (cf. FIG. 1) provided for processing the construction material 3 so that it can be reused in an additive construction process as necessary.

The unpacking tool 10 can be arranged or attached detachably on/to the robot axis A6 or the robot element RG7. To realize a detachable attachment of the unpacking tool 10, suitable, especially mechanic, mounting interfaces (not shown) can be arranged or formed on the robot 7 and/or on the unpacking tool 10, which allow detachable attachment of the unpacking tool 10 to the robot axis A6 or the robot element RG7. Detachable attachment of the unpacking tool 10 to the robot axis A6 or the robot element RG7 can also be realized by the robot axis A6 or the robot element RG7 comprising a gripping element, which is provided for gripping the unpacking tool 10.

The detachable arrangement or attachment of an unpacking tool 10 on/to the robot axis A6 or the robot element RG7 allows for an unpacking tool 10 to be arranged or attached exchangeably as necessary on/to the robot axis A6 or the robot element RG7. The robot 7 can be set, e.g., in a tool change mode or program specifically designed for that, to perform an automated change of the unpacking tool 10. Here, the robot 7, i.e., especially the robot axis A6 or the robot element RG7, can be moved to an exchange position in which the robot 7 autonomously performs an unpacking tool change. In the exchange position, the robot 7, i.e., at least the robot axis A6 or the robot element RG7, to which the unpacking tool 10 is to be or is attached detachably, can give unpacking tools 10 to a tool magazine (not shown) assigned to the unpacking device 4 or take unpacking tools 10 from a tool magazine assigned to the unpacking device 4.

As mentioned, the unpacking device 4 comprises a control device 11 provided for generating control information controlling the movements of the robot axes A1-A6 or the robot elements RG1-RG7 during operation of the robot 7. The control device 11 can be provided for generating respective control information on the basis of data describing the geometric structural design of the object 2 to be unpacked, especially on the basis of construction data describing the geometric structural design of the object 2 to be unpacked. Unpacking processes can thus be controlled individually by taking into account the geometric structural design of the respective object 2 to be unpacked. The computational effort for generating respective control information controlling the movements of the robot axes A1-A6 or the robot elements RG1-RG7 can thus be reduced.

The invention claimed is:

1. An unpacking device for unpacking an additively manufactured three-dimensional object from an unsolidified construction material after completion of an additive construction process, the unpacking device comprising:
   a robot comprising at least three robot axes;
   at least one unpacking tool arranged or formed on a robot axis of the at least three robot axes, the at least one unpacking tool configured for unpacking the additively manufactured three-dimensional object from the unsolidified construction material after completion of the additive construction process;
   a control device configured for generating control information, the control information controlling movements of the at least three robot axes during operation of the robot, wherein the control information is based on data describing a geometric structural design of the additively manufactured three-dimensional object; and
   an unpacking chamber in which the robot is movably supported in at least one freedom degree of motion within the unpacking chamber, the robot arranged supported on a bottom wall, a side wall, or a top wall limiting the unpacking chamber, the bottom wall of the unpacking chamber being coplanar with an upper surface of the unsolidified construction material after completion of the additive construction process; and
   wherein the robot is movable to pre-defined unpacking positions, the pre-defined unpacking positions based on the geometric structural design of the three-dimensional object.

2. The unpacking device according to claim 1, wherein the robot has more than three robot axes.

3. The unpacking device according to claim 1, wherein the robot axes are assigned to robot elements connected via joint elements.

4. The unpacking device according to claim 1, wherein the unpacking tool comprises a suction tool and/or a blower tool forming part of a suction device and/or a blower device.

5. The unpacking device according to claim 1, wherein the unpacking tool is arranged exchangeably on the robot axis.

6. An unpacking station for a system for additive manufacturing three-dimensional objects, wherein the unpacking station comprises at least one unpacking device according to claim 1.

7. The unpacking station according to claim 6, wherein the at least one unpacking device is movably supported on the bottom wall, the side wall, or the top wall limiting the unpacking chamber.

8. A system for additive manufacturing three-dimensional objects, the system comprising at least one unpacking station comprising the unpacking device according to claim 1.

9. The unpacking device according to claim 1, wherein the at least one unpacking tool is a suction tool.

10. The unpacking device according to claim 1, wherein the at least one unpacking tool is a blower tool.

11. An unpacking device for unpacking an additively manufactured three-dimensional object from an unsolidified construction material after completion of an additive construction process, the unpacking device comprising:
    a robot comprising at least three robot axes;
    at least one unpacking tool arranged or formed on a robot axis of the at least three robot axes, the at least one unpacking tool configured for unpacking the additively manufactured three-dimensional object from the unsolidified construction material after completion of the additive construction process;
    a control device configured for generating control information, the control information controlling movements of the at least three robot axes during operation of the robot, wherein the control information is based on data describing a geometric structural design of the additively manufactured three-dimensional object and
    an unpacking chamber in which the robot is movably supported in at least one freedom degree of motion within the unpacking chamber, the robot arranged supported on a bottom wall limiting the unpacking chamber;
    wherein the robot is movable to pre-defined unpacking positions, the pre-defined unpacking positions based on the geometric structural design of the three-dimensional object.

12. The unpacking device according to claim 11, wherein the bottom wall is coplanar with an upper surface of the unsolidified construction material after completion of the additive construction process.

13. The unpacking device according to claim 1, wherein the robot is arranged supported on the side wall limiting the unpacking chamber.

14. An unpacking device for unpacking an additively manufactured three-dimensional object from an unsolidified construction material after completion of an additive construction process, the unpacking device comprising:
    a robot comprising at least three robot axes;
    at least one unpacking tool arranged or formed on a robot axis of the at least three robot axes, the at least one unpacking tool configured for unpacking the additively manufactured three-dimensional object from the unsolidified construction material after completion of the additive construction process;
    a control device configured for generating control information, the control information controlling movements of the at least three robot axes during operation of the robot, wherein the control information is based on data describing a geometric structural design of the additively manufactured three-dimensional object; and
    an unpacking chamber in which the robot is movably supported in at least one freedom degree of motion within the unpacking chamber, the robot arranged supported on a top wall limiting the unpacking chamber;
    wherein the robot is movable to pre-defined unpacking positions, the pre-defined unpacking positions based on the geometric structural design of the three-dimensional object.

15. The unpacking device according to claim 3, wherein the joint elements are swivel joints.

16. The unpacking device according to claim 1, wherein the unsolidified construction material is a metal powder.

17. The unpacking device according to claim 1, wherein the unsolidified construction material is a ceramic powder.

18. The unpacking device according to claim 1, wherein the unsolidified construction material is a plastic powder.

19. The unpacking device according to claim 1, wherein the robot comprises six robot axes.

20. The unpacking device according to claim 1, wherein the robot is an articulated arm robot.

* * * * *